April 11, 1961     A. FRANKEL     2,979,443
MULTI-STAGE FLASH EVAPORATOR
Filed Aug. 6, 1957

Inventor
Adolf Frankel
By
Attorneys

United States Patent Office 2,979,443
Patented Apr. 11, 1961

2,979,443

MULTI-STAGE FLASH EVAPORATOR

Adolf Frankel, Gosforth, Newcastle-on-Tyne, England, assignor to Richardsons, Westgarth & Co. Limited, Northumberland, England Filed Aug. 6, 1957, Ser. No. 676,643

Claims priority, application Great Britain Aug. 7, 1956

4 Claims. (Cl. 202—173)

This invention relates to evaporators, particularly evaporators for obtaining comparatively pure water such as drinking water from sea-water or brackish water. The invention is especially applicable to multi-stage flash evaporators of the kind in which the liquid to be evaporated is circulated through a series of heaters wherein it is gradually brought to a higher temperature by the latent heat of condensation of vapour which is passed into the heaters through a series of flash chambers supplied with heated liquid from the heaters.

It is usual in such multi-stage flash evaporators for the liquid to be heated by an external source of heat, such as live steam, before it is passed into the flash chambers, and for this reason large plants generally incorporate their own boiler which supplies the necessary steam direct to the live steam heater or through a back pressure or pass-out turbine. These boilers normally operate on the closed feed system so that their make-up water requirements are fairly low, but it is nonetheless advantageous for their requirements in this connection to be supplied by the evaporating plant itself. This however can lead to uneconomic operation of the plant, because an evaporator designed to produce water such as drinking water is obviously going far beyond the purity requirements of its output if the latter is made pure enough to be used as boiler make-up water.

Accordingly, in an evaporator in accordance with the present invention, the distillate is produced in two streams of different purity, the stream of higher purity being the smaller of the two (for example, between 2 and 10% of the total distillate output) and being used as make-up water for the boiler, while the other stream constitutes the main output of the evaporator.

Thus, comparatively high purity distillate produced in one particular heater, or group of adjoining heaters, is removed from the plant separately for use as boiler make-up water.

Two examples of evaporating plants in accordance with the invention are shown in the accompanying drawings, in which.

Figure 1:
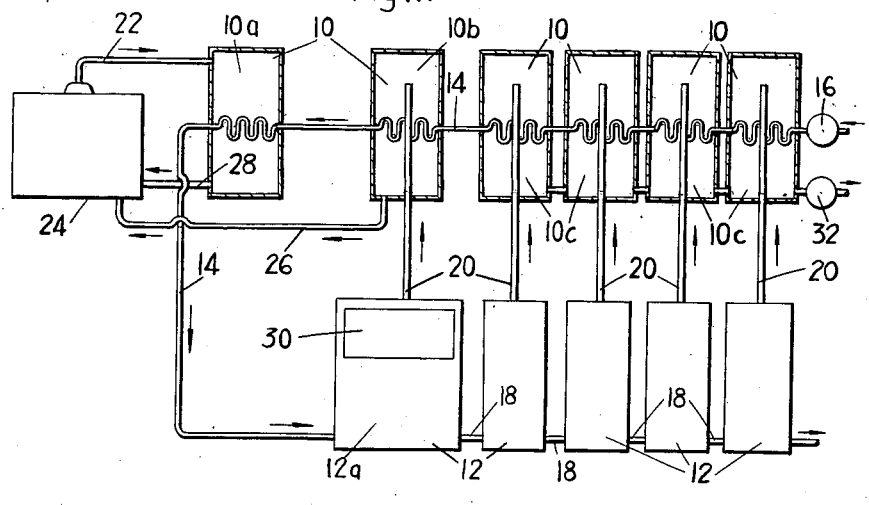
Figure 1 is a diagrammatic lay-out of one form of evaporator.

The evaporator shown in Figure 1 comprises a series of heaters 10 and a series of flash chambers 12. Liquid to be evaporated (which is referred to herein as brine) is passed through each heater in turn along the piping 14 under the pressure of a circulating pump 16. After passing through the final heater 10a, the brine is passed into the first of the flash chambers 12 and from there through each flash chamber in turn, the pipes 18 serving to connect the flash chambers in series. Some of the heated brine evaporates in the flash chambers, and the vapour is passed into the heaters 10, with the exception of the final heater 10a, through pipes 20. The flashed vapour passed into the heaters 10 gives up heat to the brine passing through the piping 14, and collects as condensate in the heaters.

The final heater 10a does not receive flashed vapour as a heating medium, but instead receives steam through a pipe 22 from a steam boiler 24. To enable the boiler 24 to be supplied with make-up water from the evaporator and not from outside, provision is made for producing vapour condensate in the heater 10b of a purity which is higher than that produced in the heaters 10c. The condensate which collects in the heater 10b is withdrawn and passed into the boiler 24 through a pipe 26. Steam condenate from the heater 10a is also passed into the boiler through a pipe 28. The flash chamber 12a supplying the heater 10b is designed to be larger in cross section than the other flash chambers, so as to operate with lower vapour velocities. It is also equipped with more efficient (and therefore more expensive) water separation equipment 30 which ensures that the distillate produced in the heater 10b is of a much higher quality than the bulk of the distillate and has a purity satisfactory for boiler make-up purposes. The evaporator shown in the drawings renders unnecessary the additional and considerable expense of providing elaborate water separation equipment and of increasing the cross-section of the flash chambers 12 throughout the plant which would be necessary if the whole plant were to be made to deliver distillate of a purity acceptable for boiler make-up purposes. The distillate collected in the heaters 10c is cascaded down from heater to heater, and is removed by a distillate extraction pump 32.

Figure 2:
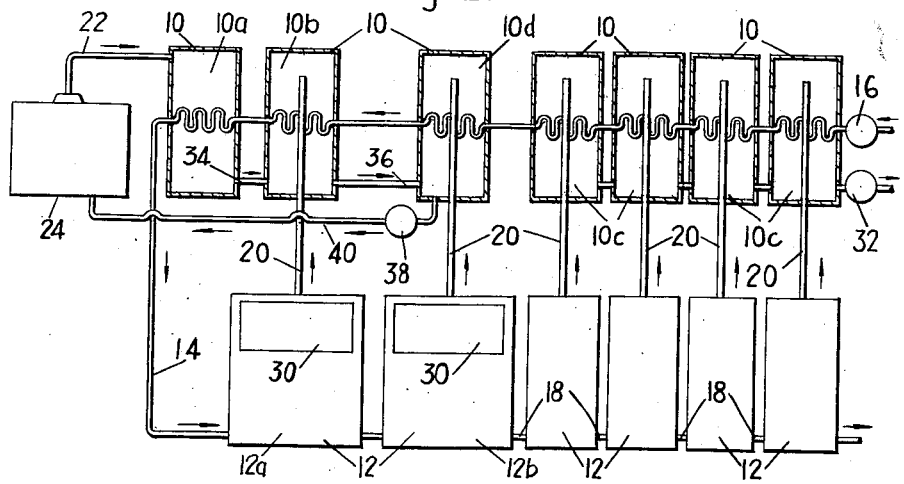
Figure 2 is a similar view of another form of evaporator.

Preferably, the heater or group of heaters producing boiler make-up distillate are at the high pressure end of the plant, that is to say, use is made of the heater 10b associated with the flash chamber 12a into which the liquid is first discharged after leaving the live steam heater 10a. If necessary, in order to achieve the required output of high purity distillate, one or two further heaters next in line to the said high temperature heater are also used for the purpose. An arrangement such as this is shown in Figure 2 where the condensate from the live steam heater 10a is cascaded through a pipe 34 into the flash heater 10b operating at the highest temperature, and from there through a pipe 36 into the next hottest flash heater 10d which is also used for the purpose of producing high purity distillate. A condensate extraction pump 38 is provided to remove from the heater the live steam condensate together with all the high purity distillate which collects in the high temperature heaters 10b and 10d. By this means, the supply of high purity condensate to the boiler through the pipe 40 is achieved at very small expense in terms of additional plant and without the need for any additional pumps or other equipment.

The use of the high pressure flash heaters 10b, 10d as a source of supply of high purity distillate for the boiler 24 has the further advantage that the specific volume of steam in the flash chambers 12a, 12b associated with them is considerably smaller than the specific volume of steam produced in the flash chambers lower down in the flashing-off process. As a result, the increase in the total size of the plant necessary to reduce the vapour velocities in the flash chambers 12a, 12b is fairly insignificant and much smaller than if such a decrease in vapour velocities were to be attempted in flash chambers operating at lower temperatures or, even more so, if it were to be applied to the whole plant.

I claim:

1. A multi-stage flash evaporator plant comprising a series of heaters wherein a stream of brine is heated, a series of flash chambers wherein brine heated in said heaters is evaporated, brine-conveying means between said series of heaters and said series of flash chambers, a steam boiler connected to at least one of said heaters whereby said heater receives steam as a heating medium, a main group of flash chambers in said series of flash chambers constructed to produce vapour distillate of a purity below the purity required of make-up water for said boiler, at least one differently-constructed flash chamber not in said main group having a horizontal cross-section which is larger than the horizontal cross-section of said flash chambers in said main group, water-separation means arranged in said one flash chamber whereby vapour distillate produced by said one flash chamber is of a purity substantially equal at least to the purity required of make-up water for said boiler, vapour-conveying means between said main group of flash chambers and a main group of said heaters whereby flashed vapour from said main group of flash chambers is condensed in said main group of heaters, distillate-extraction means connected to said main group of heaters for withdrawing distillate therefrom and removing said distillate from said evaporator plant, vapour-conveying means between said one flash chamber and at least one of said heaters not in said main group of heaters whereby flashed vapour from said one flash chamber is condensed in said one heater, and distillate-conveying means connected between said one heater and said steam boiler whereby distillate from said one heater serves as make-up water for said boiler.

2. A multi-stage flash evaporator plant as claimed in claim 1, wherein said one heater connected by said distillate-conveying means to said boiler is arranged to operate at a higher temperature and pressure than said main group of heaters.

3. A multi-stage flash evaporator plant comprising a series of heaters wherein a stream of brine is heated, a series of flash chambers wherein brine heated in said heaters is evaporated, brine-conveying means between said series of heaters and said series of flash chambers, a steam boiler connected to at least one of said heaters whereby said heater receives steam as a heating medium, a main group of flash chambers in said series of flash chambers constructed to produce vapour distillate of a purity below the purity required of make-up water for said boiler, a smaller differently-constructed group of flash chambers not in said main group each having a horizontal cross-section which is larger than the horizontal-cross-section of said flash chambers in said main group, water-separation means in each of said flash chambers in said smaller group whereby vapour distillate produced by said smaller group is of a purity substantially equal at least to the purity required of make-up water for said boiler, vapour-conveying means between said main group of flash chambers and a main group of said heaters whereby flashed vapour from said main group of flash chambers is condensed in said main group of heaters, distillate-extraction means connected to said main group of heaters for withdrawing distillate therefrom and removing said distillate from said evaporator plant, vapour-conveying means between said smaller group of flash chambers and a smaller group of said heaters not in said main group of heaters whereby flashed vapour from said smaller group of flash chambers is condensed in said smaller group of heaters, and distillate-conveying means connected between said smaller group of heaters and said steam boiler whereby distillate from said smaller group of heaters serves as make-up water for said boiler.

4. A multi-stage flash evaporator plant as claimed in claim 3, wherein distillate-conveying means are provided between said heater supplied with steam from said boiler and said smaller group of heaters whereby condensate in said steam-heated heater is cascaded to said smaller group of heaters.

References Cited in the file of this patent

UNITED STATES PATENTS

| | | |
|---|---|---|
| 643,702 | Waterhouse | Feb. 20, 1900 |
| 2,440,173 | Henszey | Apr. 20, 1948 |
| 2,759,882 | Worthen et al. | Aug. 21, 1956 |